United States Patent [19]
Shimizu et al.

[11] Patent Number: 4,623,234
[45] Date of Patent: Nov. 18, 1986

[54] CAMERA

[75] Inventors: Masami Shimizu, Tokyo; Shinichi Matsuyama, Kanagawa, both of Japan

[73] Assignee: Canon Kabushiki Kaisha, Tokyo, Japan

[21] Appl. No.: 805,403

[22] Filed: Dec. 4, 1985

Related U.S. Application Data

[63] Continuation of Ser. No. 697,003, Jan. 31, 1985, abandoned.

[30] Foreign Application Priority Data

Feb. 3, 1984 [JP] Japan .................................. 59-19169

[51] Int. Cl.⁴ ............................................. G03B 17/00
[52] U.S. Cl. .................................... 354/286; 354/475; 354/442
[58] Field of Search ............................... 354/441–445, 354/465, 471, 474, 475, 286, 289.1, 289.12

[56] References Cited

U.S. PATENT DOCUMENTS

| | | | |
|---|---|---|---|
| 4,172,651 | 10/1979 | Wiessner et al. | 354/286 |
| 4,181,419 | 1/1980 | Schlapp et al. | 354/286 |
| 4,275,953 | 6/1981 | Watanabe et al. | 354/286 |
| 4,329,034 | 5/1982 | Murakami et al. | 354/474 |
| 4,391,488 | 7/1983 | Ishizaka et al. | 354/286 |
| 4,483,603 | 11/1984 | Metabi et al. | 354/286 |

Primary Examiner—Russell E. Adams
Attorney, Agent, or Firm—Toren, McGeady, Stanger, Goldberg & Kiel

[57] ABSTRACT

An automatic exposure control camera is arranged to permit selection of a stop-down aperture priority mode in which an actually stopped down aperture has priority when a specific lens is mounted on the camera.

10 Claims, 17 Drawing Figures

FIG.6

| VOLTAGE \ OUTPUT SIGNAL | 83a | 83b | 83c |
|---|---|---|---|
| $V_1$ | 0 | 0 | 0 |
| $V_2$ | 0 | 0 | 1 |
| $V_3$ | 0 | 1 | 1 |
| $V_4$ | 1 | 1 | 1 |

FIG.7

| MAXIMUM APERTURE VALUE \ OUTPUT OF MAXIMUM APERTURE VALUE SIGNAL GENERATING CKT | 87a | 87b | 87c |
|---|---|---|---|
| 1.2 | 0 | 1 | 1 |
| 1.4 | 0 | 0 | 1 |
| 2 | 0 | 0 | 0 |
| 2.8 | 1 | 0 | 0 |
| 4 | 1 | 1 | 0 |
| 5.6 | 1 | 1 | 1 |

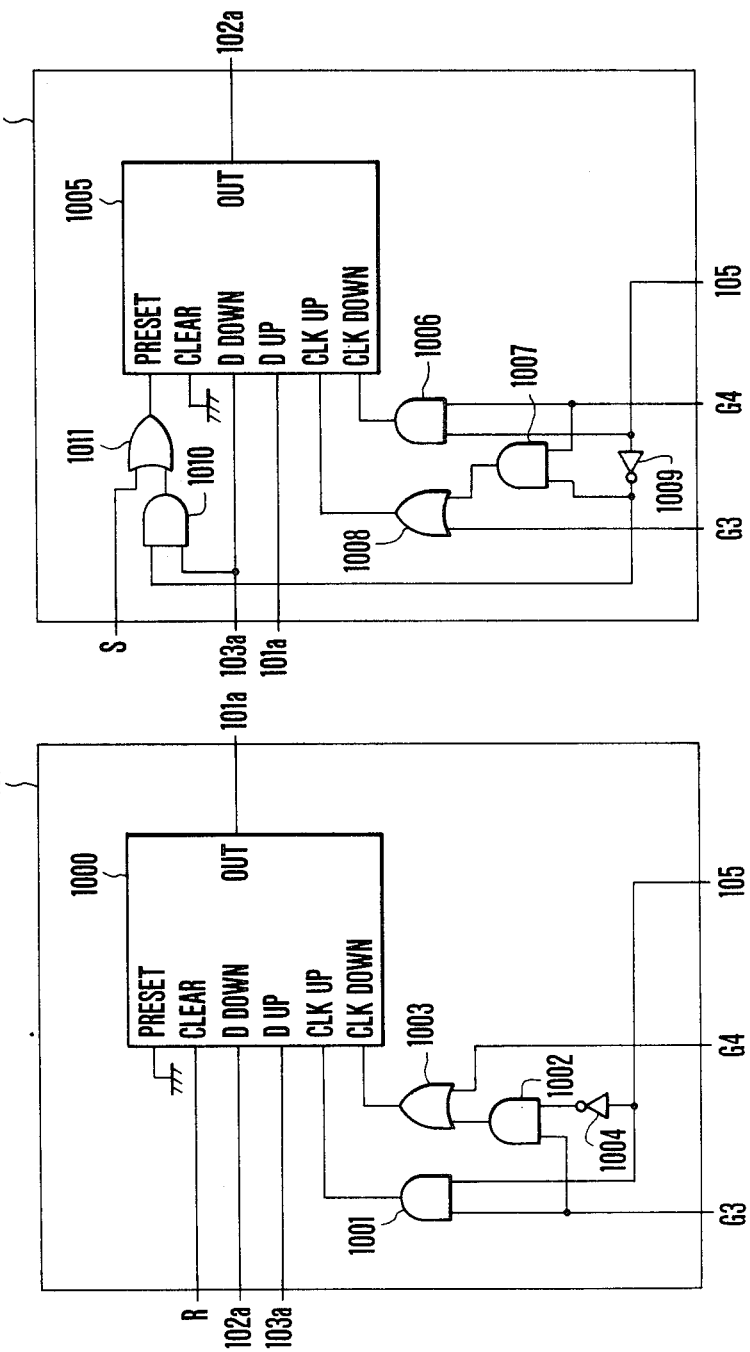

CAMERA

This is a continuation of application Ser. No. 697,003, filed Jan. 31, 1985, now abandoned.

BACKGROUND OF THE INVENTION

1. Field of the Invention

This invention relates to a camera permitting automatic exposure control (hereinafter will be called AE) and more particularly to a camera having an open aperture light measurement mode and a stop-down aperture priority AE mode.

2. Description of the Prior Art

The conventional camera of the kind having an open aperture light measurement mode and a stop-down aperture priotity AE mode permits mounting thereon an interchangeable lens adapted for open aperture light measurement and an interchangeable lens adapted for stop-down aperture light measurement. The conventional camera of this kind and the open aperture light measurement type interchangeable lens have been arranged as shown in FIG. 1 of the accompanying drawings. For an open aperture light measuring aperture priority AE mode and an open aperture light measuring shutter priority AE mode, the lens is provided with an automatic aperture control signal member which is arranged to be interlocked with the camera body and an aperture presetting signal member. A stop ring on aperture setting ring is arranged on the interchangeable lens to permit presetting a desired aperture value. The preset aperture value is transmittable to the camera body via a preset aperture signal member for TTL open apreture light measurement. The camera can be operated in an aperture priority AE mode by computing a shutter time value from the preset aperture value and a TTL open aperture light measurement value and by controlling the shutter time on the side of the camera body. When the stop ring is adjusted to an automatic operating position on the side of the interchangeable lens, the camera can be operated in a shutter priority mode with an aperutre value controlled by computing the aperture value from a shutter time value set on the side of the camera body and a TTL open aperture light measurement value and by controlling the above stated automatic aperture control signal member from the camera body.

Further details of arrangement of the conventional camera will be understood from the following description with reference to FIGS. 1 and 2: Referring to FIG. 1, a lens 202 is coupled with a camera body 204 by moving it in the direction of arrow λ. The camera body 204 is provided with a mounting ring 276 on the side on which the above-stated lens 202 is to be mounted. Three separate flange parts 278A, 278B and 278C are arranged to protrude from the outer circumferential edge of the mounting ring 276. The mounting ring 276 is rigidly secured to the camera body 204 and is arranged in parallel with a film surface which is disposed perpendicularly to an opticl axis of the lens with the optical path of the lens being thus encompassed with the mounting ring. Since the mounting ring 276 is a sole member for coupling the lens assembly 202 with the camera body 204, inaccurate mounting and a secular change thereof would affect the image of an object to be formed on the film surface. In relation to the mounting ring 276, a clamp ring 210 is turnably arranged on the side of the lens assembly 202. Under the condition as shown in FIG. 1, when the lens assembly 202 is moved in the direction of arrow λ to couple it with the body 204, the flange parts 278A, 278B and 278C of the mounting ring 276 are passable through notch parts 280A, 280B and 280C which are provided in a ring part. With these flange parts having passed these notch parts, when the clamp ring 210 is turned in the direction of arrow φ, the flange parts 278A, 278B and 278C engage non-notched parts 282A, 282B and 282C of the clamp ring 210 to have the lens assembly 202 thus secured to the camera body 204.

On the mounting side of the lens assembly 202 at which the lens is to be mounted on the camera body 204, there are provided various mechanisms for control and exchange of information between the lens and the body. A lever 284 relates to the number of steps to which the aperture of the lens assembly 202 is stopped down from a maximum aperture position. The lever 284 is movable in the directions of arrows ψ and φ along an annular slot 286 and is urged by a strong spring to move in the direction of arrow φ. However, when the lens assembly 202 is not mounted on the body 204 and is still in a preparative state as shown in FIG. 1, the lever 284 remains in a state of having been moved through the annular slot 286 in the direction of arrow φ. The lever 284 is released from this state when the clamp ring 210 is turned in the direction of arrow φ for mounting the lens assembly 202 on the camera body 204. In that case, the lever 284 which is a preset aperture signal member is caused by the urging force of the above-stated spring to move in the direction of arrow φ until the movement is restricted at a certain point. At this point, the lever 284 is in a position which corresponds to the number of stopped down steps of aperture from the maximum aperture position for a preset aperture value. The number of aperture stop down steps increases according as the lever 284 move further in the direction of arrow φ and becomes smaller according as the lever moves less in that direction. As mentioned in the foregoing, the lens assembly 202 permits presetting of an aperture value by means of an aperture setting ring 208. The movement restricted position of the lever 284 varies with the preset aperture value. Therefore, the lever 284 moves according as the preset aperture value varies. Accordingly, information on the number of stopped down steps of the preset aperture value which is set on the aperture setting ring 208 can be transmitted by the position of the lever 284 to the camera body 204.

When the aperture setting ring 208 has its mark 212 adjusted to an index 207, the lever 284 is in a position corresponding to a maximim stopped down position of the aperture of the lens assembly and is in a state of having been fully moved through the annular slot 286 by the urging force of the spring. The lever 284 is movable in the direction of arrow ψ, i.e. toward a smaller number of aperture steps, against the uring force of the spring from any position in which its further movement in the direction of arrow φ by the spring force is restricted. In other words, it is possible to obtain a desired aperture value by setting the lever 284 against the spring force at a desired postion without recourse to the aperture setting ring 208.

The lens assembly 202 is provided with a stop-down lever 288 which is a signal member for automatic aperture control; and a maxium aperture signal pin which protrudes to an extent corresponding to a minimum stop down value, i.e. the maximum aperture value of the photo taking lens assembly 202. This pin 290 is used for transmitting information on the maximum aperture value of the lens assembly to the camera body 204. A minimum aperture signal pin 291 is protruding to an extent corresponding to a maximum stop down value, i.e. the mimimum aperture value of the phototaking lens assembly 202 and is arranged to transmit the maximum stop down value of the lens assembly to the camera body 204. This minimum aperture signal pin 291 is used for detecting the controllable stopping down limit of the lens assembly 202 in carrying out an exposure control operation.

An AE pin 292 is arranged to protrude when the lens is in an automatic exposure control mode with the mark 212 which is provided on the aperture setting ring 208 adjusted to the index 207. In that mode, the AE pin 292 engages an AE detecting part which is interlocked with a switch S4 as will be further described later. In this instance, no aperture value is preset on the side of the lens assembly 202 and the aperture is controlled from the camera body according to information transmitted by the AE pin to the body 204.

Meanwhile, on the side of the camera body 204, there are provided various mechanisms which cooperate with the above-stated various mechanisms disposed on the side of the lens. These mechanisms on the side of the camera body includes a clamp mechanism which clamps the AE lever 294 at a suitable position determined on the basis of either an aperture value set by means of a dial or a controlled aperture value obtained through computation. The operation of this clamp mechanism brings the AE lever 294 to a stop at the clamped position. Accordingly, the movement of the lever 284 in the direction of arrow $\phi$ is restricted to a point which corresponds to the clamped position of the AE lever 294. Then, a number of stopping down steps is preset at that point. Therefore, the clamped position of the AE lever 294 is very important for determining a number of steps to which the aperture of the lens assembly 202 is to be stopped down. A mechanism or device which is arranged to detect the clamped position, therefore, must have a high degree of precision. This device is arranged in such a manner that: When the AE lever 294 moves in the direction of arrow $\sigma$ from a locked position which is a reference position, the extent of this move is converted into a number of pulses which are arranged to correspond to a number of stopping down steps of aperture. Then, a desired number of stopping down steps can be obtained by counting these pulses. For the purpose of this invention, a condition in which the AE lever 294 is locked in the reference position is called an AE charged condition and an operation to lock the AE lever 294 in the reference position is called an AE charging operation. Further, an operation to unlock the lever 294 from the reference position is called an AE discharge.

A maximum aperture value input pin 296 is arranged to receive information on the maximum aperture value of the lens assembly 202. The pin 296 abuts on the maximum aperture signal pin 290 of the lens assembly 202 to receive thereby a signal which corresponds to the protruding extent of the pin 290 and to the maxium aperture value of the lens assembly as shown in FIG. 2. This maximum aperture value input pin 296 is connected to a maximum aperture value signal generating ciucuit 87 which is arranged to convert the moving extent of the input pin 296 into a digital value as will be further described later herein. As a result, the information on the maximum aperture value of the lens assembly 202 is obtained in a digital value.

A minimum aperture value input pin 297 is arranged to receive information on the minimum aperture value of the lens assembly 202. The pin 297 abuts on the minimum aperture signal pin 291 of the lens assembly 202 to receive thereby a signal which corresponds to the protruding extent of the pin 291 and to the maximum stop down value, i.e. the minimum aperture value, of the lens assembly 202. This input pin 297 is connected to a device for converting the moving extent of the pin into a digital value, so that the maximum stop down value of the aperture of the lens assembly 202 is thus obtained in a digital value.

A side face of a stop drive lever 298 which faces in the direction of arrow $\epsilon$ is arranged to abut or confront one side of the stop down lever 288 of the lens assembly 202 which faces in the direction of arrow $\Omega$. The lever 298 is arranged such that, before commencement of an exposure at the time of shutter release, the lever 298 is moved in the direction of arrow $\epsilon$ to drive the stop down lever 288 in the direction of arrow $\nu$, so that the aperture of the lens assembly 202 can be stopped down by the lever 284 from its full open position to a specific stopped down position. Upon completion of the exposure, the stop drive lever 298 moves in the direction of arrow $\omega$ to come back to its original position and thus brings the aperture of the lens assembly 202 back to the full open state thereof.

An AE detecting part 200 confronts the AE pin 292 of the lens assembly 202. The part 200 includes a switch S4. When the mark 212 is selected by the aperture setting ring 208 of the lens assembly 202, the AE pin 292 which protrudes at that instant causes the switch S4 of the AE detecting part 200 to turn off. When the mark 212 is not selected by the ring 208, the switch S4 turns on as the AE pin 292 does not protrude in that case. With the switch S4 arranged in this manner, the AE detecting part 200 produces a signal according to selection between automatic and manual operation modes.

As will be apparent from the description given above, the mark 212 of the aperture setting ring 208 must be adjusted to the index 207 in cases where the aperture value of the lens assembly 212 is to be controlled from the camera body 204. In view of this, hereinafter this mark 212 will be referred to as the AE mark.

The interchangeable lens which is adapted for open aperture light measurement is thus provided with the stop down lever 288 which is a signal member for automatic aperture control and another lever 284 which is a signal member for transmission of a signal representing a preset aperture value. With these member arranged to cooperate with the camera, the lens is capable of transmitting information to the camera.

However, in the conventional camera of the kind using the open aperture light measurement type interchangeable lens, it is necessary that the automatic aperture control signal member is brought, in response to a film winding operation, back to its initial position in which the aperture is full open and also to be moved, in response to a release operation of the camera, from the intial position in the direction in which the stopped down extent of the aperture increases. This necessity has presented the following problem: Since the automatic aperture control signal member is always kept in the full open aperture position upon completion of film winding, it has been impossible to confirm the depth of focus as the aperture is not stopped down in spite of an attempt to actually stop down the aperture prior to a photo-taking operation. To solve this problem, Japanese Laid-Open Patent Application No. SHO 52-91426 has disclosed a camera, wherein the aperture can be stopped down by manually driving the stop drive lever 298 even when an open aperture light measurement type interchangeable lens is mounted on the camera. This camera of the prior art, however, has necessitated not only complex mechanical arrangement but also an operation which is too complex for a beginner photographer.

Meanwhile, an interchangeable lens of the kind adapted for stop down aperture light measurement is not provided with the above-stated automatic aperture control signal member nor the preset aperture signal member though the lens is arranged in a manner similar to the interchangeable lens adapted for open aperture light measurement as described in the foregoing. Therefore, no aperture information is transmitted to the camera even the interchangeable lens is set at a desired aperture value by means of the aperture setting ring thereof and TTL open aperture light measurement cannot be accomplished and the aperture of the lens is merely arranged to be stopped down. With a stop down aperture light measurement type interchangeable lens mounted thereon, therefore, the camera is incapable of performing a photo-taking operation neither in the open aperture light measuring, aperture priority AE mode nor in the open aperture light measuring, shutter priority AE mode. For automatic exposure control photographing (AE photographing), the lens of this kind permits photographing solely in a stop down aperture priority AE mode in which a shutter itme value is determined by computation on the basis of a light measurement value obtained from light measurement carried out with the aperture of the interchangeable lens stopped down and information of the sensitivity of the film in use.

Further, in the open aperture light measurement type interchangeable lens, the maximum aperture value of the lens is arranged to be represented by the height of the full-open or maximum aperture signal pin 290 as shown in FIG. 2 and to have information thereon taken in by the full-open or maximum aperture signal input pin 296 arranged on the side of the camera body. Meanwhile, in the case of the stop down aperture light measurement type interchangeable lens, the position or height of the end face of the lens corresponding to the position of the full-open aperture signal pin 290 as shown in FIG. 2 is arranged to represent F 5.6 irrespective of the maximum aperture value of the lens. In the stop down aperture light measurement type lens, unlike the open aperture light measurement type lens, the mark 212 is not selected by the aperture setting ring 208 of the lens assembly 202 and there is provided nothing that corresponds to the AE pin 292. Accordingly, in that case, the AE detecting part 200 is never pushed inward by such a pin. The stop down aperture light measurement type interchangeable lens and the open aperture light measurement type interchangeable lens can be distinguished from each other by the following condition:

In the case of the stop down aperture light measurement type interchangeable lens, the height corresponding to the position of the above-stated full open or maximum aperture signal pin 290 corresponds to F 5.6; and the AE detecting part 200 is never pushed in. The camera can be judged to have a stop down aperture light measurement type interchangeable lens mounted thereon in case where these conditions are satisfied and to have an open aperture light measurement type interchangeable lens mounted thereon in case these conditions are not satisfied.

SUMMARY OF THE INVENTION

In view of the problems of the prior art mentioned in the foregoing, a first object of the present invention is to provide a camera which is arranged to permit selection of a specific AE mode only when a lens of a specific kind is mounted on the camera and to inhibit selection of the specific AE mode when other lenses are mounted on the camera.

In connection with the first object, a second object of this invention is to provide a camera which is arranged to permit selection of a stop-down aperture priority AE mode when a lens of a specific kind is mounted on the camera and to inhibit selection of the stop-down aperture priority AE mode when other lenses are mounted on the camera.

It is a third object of this invention to provide a camera which is of the kind having a display device for displaying photographing operation modes and is arranged to inhibit the display of a specific photographing operation mode according to the type of an adapter mounted on the camera.

These and further objects and features of the invention will become apparent from the following detailed description of a preferred embodiment thereof taken in connection with the accompanying drawings.

BRIEF DESCRIPTION OF THE DRAWINGS

FIG. 6 is a table showing the relation of the output of a battery voltage checker to the voltage of a power source battery.

FIG. 7 is a table showing the relation of the output of a maximum aperture value signal generating circuit to the maximum aperture value of a photo-taking lens.

FIGS. 9(a) and 9(e) are plan views showing by way of example the display patterns of the external display device, in which: FIG. 9(a) shows display patterns obtained when power supply is switched on; FIG. 9(e) shows a display pattern urging the photographer to replace the battery as the power supply voltage is found close to an inhibiting voltage by a battery check process.

FIGS. 10-12 respectively show the detail of the registers 101-103 shown in FIG. 8.

DETAILED DESCRIPTION OF THE PREFERRED EMBODIMENT

Figure 3:
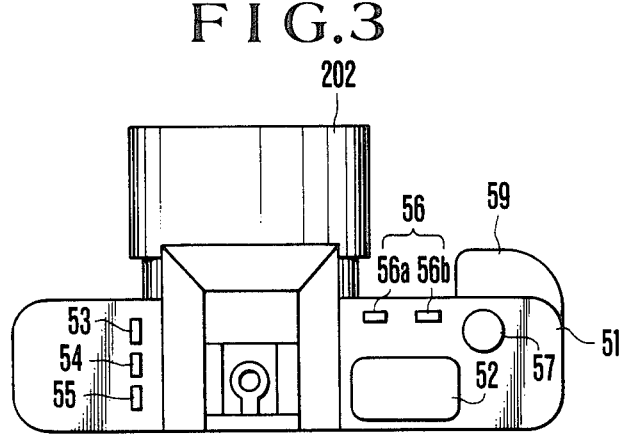
FIG. 3 is a plan view showing the upper lid of a camera to which this invention is applied.
Figure 4:
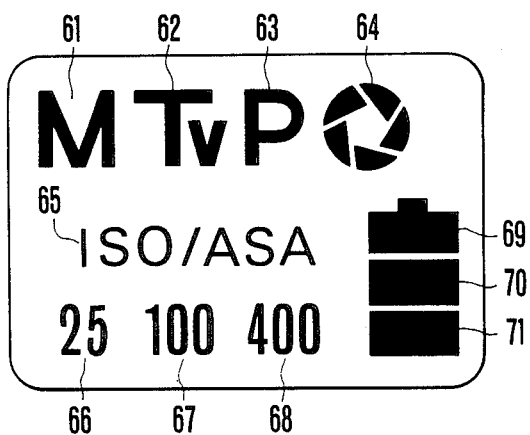
FIG. 4 is a plan view showing an external display device of the camera as in a state of having all the display patterns of it alight.

Referring to FIG. 3 which shows in a plan view the upper lid of a camera embodying the present invention, the upper lid 51 is provided with an external display device 52; a button 53 for selecting an exposure control mode; a button 54 for selecting a film sensitivity value; a battery check button 55; a shift buttons 56 for changing the exposure control mode and the film sensitivity value selected, the shift buttons including an up shifting button 56a and a down shifting button 56b; and a shutter button 57 which is arranged to have light measurement carried out when it is pushed down to a first step stroke and to have shutter release performed when it is pushed down to a second step stroke. The camera is provided with a grip 59 for an improved feel in holding the camera. FIG. 4 shows the above-stated external display device as in a state of having all the display patterns alight. The external display device is composed of a liquid crystal in this embodiment.

Referring to FIG. 4, liquid crystal cells 61-64 are arranged to display marks indicative of photographing operation modes, the cell 61 indicating a manual operation mode, the cell 62 a shutter priority AE mode, the cell 63 a programed AE mode and the cell 64 a stop down aperture priority AE mode respectively. A liquid crystal cell 65 displays a mark indicative of a film sensitivity value in combination with one of other liquid crystal cells 66, 67 and 68 which are arranged to light up according to selection of the film sensitivity value. Liquid crystal cells 69, 70 and 71 are arranged to display the power supply voltage capacity in a bar graph manner in response to a battery check operation.

Figure 2:
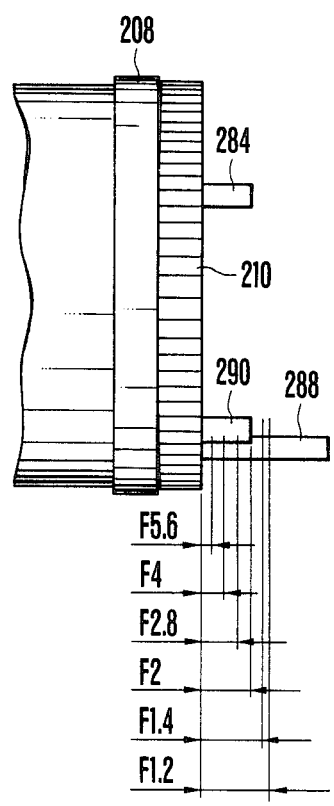
FIG. 2 is a side view of the lens assembly shown in FIG. 1.
Figure 5:
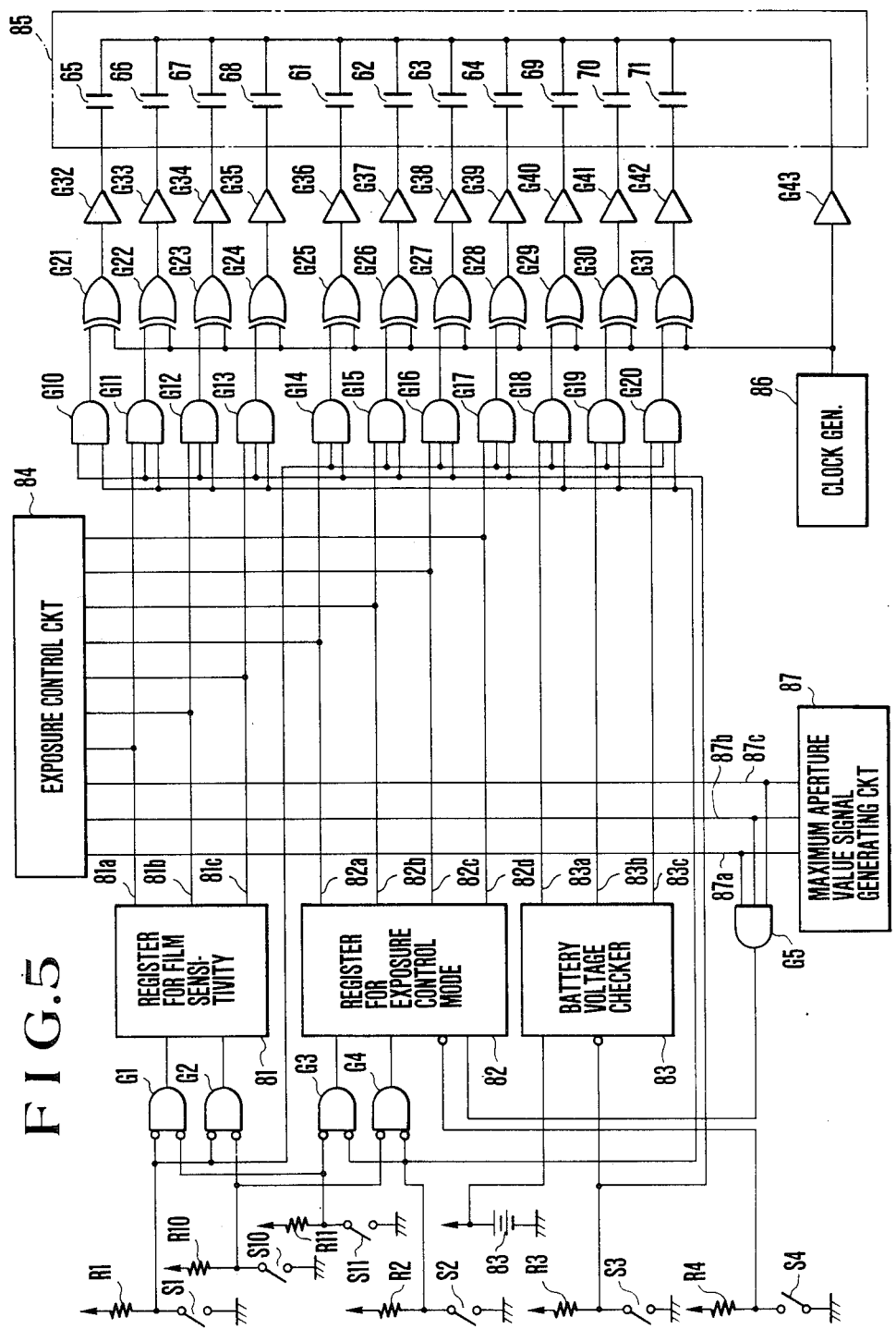
FIG. 5 is a circuit block diagram showing a driving circuit arranged to drive the external display device shown in FIG. 4.
Figure 8:
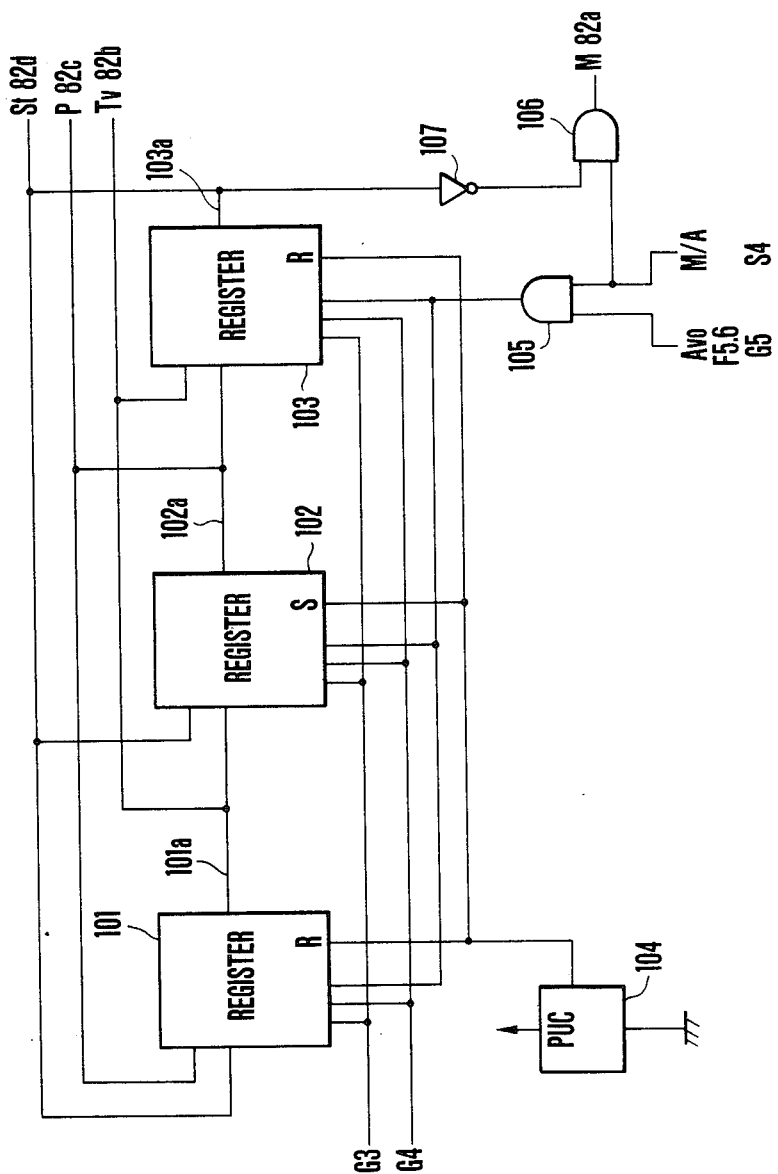
FIG. 8 is a block diagram showing the details of a register for an exposure mode.

FIG. 5 is a circuit diagram showing a driving circuit for driving the luquid crystal display arrangement of the external display device shown in FIG. 4. A switch S1 turns on when the film sensitiviry setting button 54 shown in FIG. 3 is pused in setting the camera at a film sensitivity value. A switch S2 turns on when the photographing operation mode selection button 53 is pushed. A battery check switch S3 turns on when the battery check button 55 which is shown in FIG. 3 is pushed. Another switch S4 is disposed at the AE detecting part mentioned in the foregoing. The switch S4 is on when the lens assembly 202 is in the manual mode and is off when the lens assembly 202 is in the automatic mode. A switch S11 turns on in response to the operation of the up shifting button 56a of FIG. 3. A switch S10 turns on in response to the operation of the down shifting button 56b of FIG. 3. Pull-up resistors R1-R4, R10 and R11 are provided for the above-stated switches. An AND gate G1 is arranged to receive the inverted signals of the switches S1 and S11 and to supply an up shifting signal to register 81 provided for film sensitivity. An AND gate G2 is arranged to receive the inverted signals of the switches S1 and S10 and to supply a down shifting signal to the register 81 for film sensitivity. An AND gate G3 is arranged to receive the inverted signals of the switches S2 and S11 and to supply an up shifting signal to a register 82 which is provided for an exposure control mode. An AND gate G4 is arranged to receive the inverted signals of the switches S2 and S10 and to supply a down shifting signal to the resister 82. The register 81 for film sensitivity is arranged to store one of film sensitivity values ISO 25, 100 and 400 and to shift three-bit information output signals 81a, 81b and 81c from one to another according to the signals from the AND gates G1 and G2. The register 81 supplies the film sensitivity information to an exposure control circuit 84. The register 82 for the exposure control mode is arranged to store the exposure control mode selected by the switches S2 and S11 and to drive the display liquid crystal cells 61, 62, 63 or 64 according to the exposure control mode selected. A battery voltage checker 83 is arranged to measure the voltage of the power supply and to produce one of signals 83a, 83b and 83c as shown in FIG. 6 for driving the liquid crystal cells 69-70 shown in FIG. 4 according to the measured voltage when the switch S3 turns on. Rererring to FIG. 6, a voltage V1 of the power source battery 83 is lower than the operatable thershold voltage (or inhibiting voltage) of the camera; a voltage V2 is a little higher than the inhibiting voltage; a voltage V4 is a sufficiently high power supply voltage; and a voltage V3 is at a level between the voltages V2 and V4. A clock pulse generator 86 is arranged to generate a liquid crystal driving rectangular wave (duty ratio 50%, 32 Hz). AND gates G10-G20 are arranged to receive the outputs of the switches S1-S3, the film sensitivity register 81, the exposure control mode register 82 and the battery voltage checker 83 and to produce and supply the results of logical operations to exclusive OR gates G21-G31. The above-stated exposure control circuit 84 is arranged to perform exposure control according to the applicable mode on the basis of the signal of the film sensitivity register 81, that of the exposure control mode register 82 or that of a maximum aperture value signal generating circuit 87. The maximum aperture value signal generating circuit 87 is arranged to prodice a signal as shown in FIG. 7 according to the height of the pin which represents a full open or maximum aperture value AVO as shown in FIG. 2. As apparent from FIG. 7, an AND gate G5 produces "1" when the maximum aperture value AVO of the lens is F 5.6. Referring now to FIG. 8, the details of arrangement of the exposure control mode register 82 are as described below:

As shown in FIG. 8, the register 82 comprises registers 101, 102 and 103 which are respectively provided for a shutter time priority AE mode, a programed AE mode and a stop down aperture priority AE mode. The output terminals 101a, 102a and 103a are respectivery connected to the output terminals 82b, 82c and 82d shown in FIG. 5. The input terminals of these registers 101, 102 and 103 are arranged to commonly receive the up shifting signal produced from the AND gate G3, the down shifting signal produced from the AND gate G4, a PUC signal produced from a power-up-clear circuit 104, a manual/automatic switch-over signal of the lens obtained by the switch S4 and the output of an AND gate 105. In addition to that, these input terminals of the registers are interconnected each with the output terminals of other two registers among them.

In case that the lens is under manual control and its maximum aperture AVO is F 5.6 and the signal "1" is produced from the AND gate 105, the register 101 takes in and stores the state of the output 103a of the register 103 at the rise of the up shifting signal and the state of the output 102a of the register 102 at the rise of the down shifting signal. In case where the lens is under automatic control or the maximum aperture AVO is at F 5.6. or when the signal from the AND gate 105 is "0", the register 101 takes in and stores the state of the output 102a of the register 102 at the rise of either the up shifting signal or down shifting signal.

The register 102 is arranged to take in and store the state of the output 101a of the register 101 at the rise of the up shifting signal when the lens is under manual control and the value AVO is F 5.6; and to take in and store the state of the output 103a of the register 103 at the rise of the down shifting signal under the same condition. When the lens is under automatic control or the value AVO is F 5.6, the register 102 takes in and stores the state of the output 101a of the register 101 at the rise of either the up shifting signal or the down shifting signal. The register 103 is arranged to take in and store the state of the output 102a of the register 102 at the rise of the up shifting signal and to take in and store the state of the output 101a of the register 101 at the rise of the down shifting signal when the lens is under manual control and the value AVO thereof is F 5.6; and to make its stored value "0" at the rise of either the up shifting signal or the down shifting signal when the lens is under automatic control or the value AVO thereof is F 5.6.

As described above, the three registers 101, 102 and 103 operate as an irregular 3-bit shift register. In other words, when the lens is under manual control and the maximum aperture value thereof is F 5.6, the rise of the up shifting signal causes one bit shift to take place from the register 101 to the register 102, from the register 102 to the register 103 and from the register 103 to the register 101, one after another. The rise of the down shifting signal causes one bit shift to take place, from the register 103 to the register 102, from the register 102 to the register 101 and from the register 101 to the register 103, one after another. In case that the lens is under automatic control or the value AVO thereof is at F 5.6, the register 103 remains inoperative while the registers 102 and 101 operate as a 2-bit shift register.

When power supply is switched on, the power-up-clear circuit produces a PUC shignal. Then, one pulse of this PUC signal resets the registers 101 and 103 to make their outputs "0" and sets the register 102 to make its output "1". Thus, at the time when the power supply is switched on, the camera is automatically set into the programed AE mode for which the register 102 is provided.

The output 82a of the exposure control mode register 82 is obtained as a logical product of the output of the AND gate 106 which produces a lens manual-/automatic control signal and the output of an inverter 107 which is obtained by inverting the output 103a of the register 103. Then, the liquid crystal cell 61 is selected and the pattern or mark "M" is displayed when the lens is under manual control and the camera is not in the stop down aperture priority AE mode.

Details of the shift register shown in FIG. 8 will be described below with reference to FIGS. 10 to 13.

Description will be made on the operational fuctions of the AE mode resister 101 with reference to FIG. 10.

In FIG. 10, 101a, 102a, 103a, G3 and G4 are respectively connected to the same reference numbers in FIG. 8. The register 1000 forces the "out" to "1" when the preset input is "1", forces the "out" to "0" when the clear input is "1", and takes in and stores the state of the D-up input and outputs signals through the "out" on the basis of the rising signal of the CLK-up input, and takes in and stores the state of the D-down input and outputs signals thorugh the "out" on the basis of the rising signal of the CLK-down input. The numerical references 1001 and 1002 represent respectively an AND gate, 1003 represents an OR gate and 1004 is an inverter.

In the above embodiment, when the lens is under manual control operated and Avo=F5.6, namely when the signal from the AND gate 105 is "1", the AND gate 1001 gives a rising signal to CLK-up in response to the rising of the shift-up signal G3, and the register 1000 takes in and stores the state of the D-up input on the basis of this rising signal and outputs signals to 101a connected to the "out". Then, as the AND gate 1002 receives "0" at its input resulting from the inversion of the output from the 105 by the inverter 1004, it continues to output "0" independently of the input G3 at the other terminal, and as the OR gate 1003 which inputs the "0" and "G4", continues to give "0" to CLK-down because both inputs are "0". Meanwhile, the OR gate 1003 gives a rising signal to the CLK-down and the register 1000 takes in and stores the state of 102a which is the D-down input in response to the rising signal and outputs signals to 101a connected to the "out".

When the lens is under automatic control, or when Avo is not equal to F5.6 (Avo≠F5.6), namely when the signal from the AND gate is "0", the AND gate 1001 receives at its one terminal "0", so that it continues to output "0" to CLK-up and the AND gate 1002 is given at its one input terminal the signal obtained by the inversion of the state of 105 by the inverter 1004, namely a signal "1". Therefore, the AND gate sends the rising of the shit-up signal G3 to the OR gate 1003. Also the shift-down signal G4 is given to the OR gate as it stands, the rising signals of both the shift-up signal G3 and the shift-down signal G4 are given to CLK-down. Therefore, the register 1000 takes in and stores the D-down input 102a and outputs signals to 101a connected to the "out". On the other hand, when the PUC signal is given to "R", the output 101a is forced to "0".

Detailed description of the register 102 in the case of Program AE Mode will be made with reference to FIG. 11. In FIG. 11, 101a, 102a, 103a, G3, G4 and 105 are respectively connected to the same numerical numbers in FIG. 8. The register 1005 has similar operational functions as the register 1000 in FIG. 10. 1006, 1007, and 1010 are respectively an AND gate, 1008 and 1011 are respectively an OR gate and 1009 is an inverter.

In this embodiment, when the lens is under manual control operated and Avo=F5.6, namely when the signal from the AND gate 105 is "1", the AND gate 1006 gives a rising signal to CLK-down in response to the rising of the shift-down signal G4 and the register 1005 takes in and stores the state of 103a which is the D-down input on the basis of the rising signal and outputs signals to 102a connected to the "out". At this stage, as the AND gate 1007 is given "0" an input which is obtained by the inversion of the output from the 105 by the inverter, the AND gate 1008 continues to output "0" independently of the other input G4 and the OR gate 1008, which receives "0" and G3 as input, continues to give "0" to CLK-up because G3 is also "0". The OR gate 1008 gives a rising signal to CLK-up in correspondence to the rising of the shift-up signal G3, and the register 1005 takes in and stores the state of 101a which is the D-up signal in correspondence to the rising signal and outputs signals to 102a connected to the "out".

When the lens is under automatical control or when Avo is not equal to F5.6 (Avo≠F5.6), namely when the signal from the AND gate 105 is "0", the AND gate 1006 which receives "0" as input at its one terminal, continues to send "0" to CLK-down, while the AND gate 1007, which receives at its one input terminal the signal "1" obtained by the inversion of the state of 105 by the inverter 1009, gives the rising of the shit-down signal G4 to the OR gate 1008. The shift-up signal G3, as it stands, is also given to the OR gate 1008, so that both the shift-up signal G3 and the shift-down signal G4 are given to CLK-up as the rising signal. Therefore, the register 1005 takes in and stores the D-up input 101a in response to the rising signal of G3 or G4 and outputs signals to 102a connected to the "out". When the PUC signal is given to S, the output 102a is forced to be "1" because the signal is given to the preset input through the OR gate 1011. When 105 becomes "0" with 103a being "1", "1" is given to the AND gate 1010 by the inverter 1009, and the AND gate outputs "1", which is given to the preset input through the OR gate 1011 so that the output 102a is forced to be "1".

Figure 12:
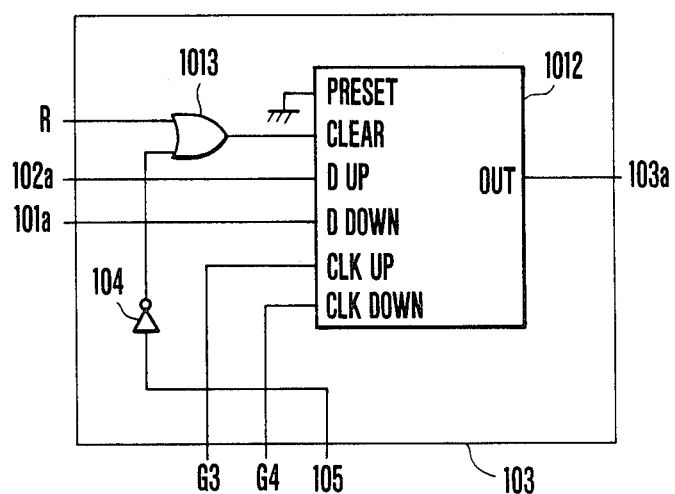

Detailed description of the operational functions of the register 103 in the diaphragm preference mode will be made with reference to FIG. 12.

In the drawing, 101a, 102a, 103a, G3, G4 and 105 are respectively connected to the same numbers in FIG. 8. The register 1012 has similar operational functions as the register 1000 in FIG. 10. 1013 is an OR gate and 1014 is an inverter.

In this embodiment, when the lens is under manual control and Avo=F5.6, namely when the signal of the AND gate 105 is "1", the register 1012, when given a rising signal from the shift-up signal G3, takes in and stores the state of the D-up input 102a and outputs signals to 103a connected to the "out", and when given a rising signal from the shift-down signal G4, the register takes in and stores the state of the D-down input 101a and outputs signals to 103a connected to the "out".

When the lens is under automatic control or Avo is not equal to F5.6 (Ave≠F5.6), namely when the signal from the AND gate 105 is "0", the signal is inverted by the inverter 1014 and gives "1" to CLEAR through the OR gate 1013 and the register 1012 forcedly converts 103a connected to the "out" to "1". When the PUC signal is given to R, the output of the OR gate 1013 becomes "1", and the register 1012 forces 103a connected to the "out" to "0".

Further description will be made on the operational functions of the registers 1000, 1005 and 1012 with reference to FIG. 13.

Figure 13:
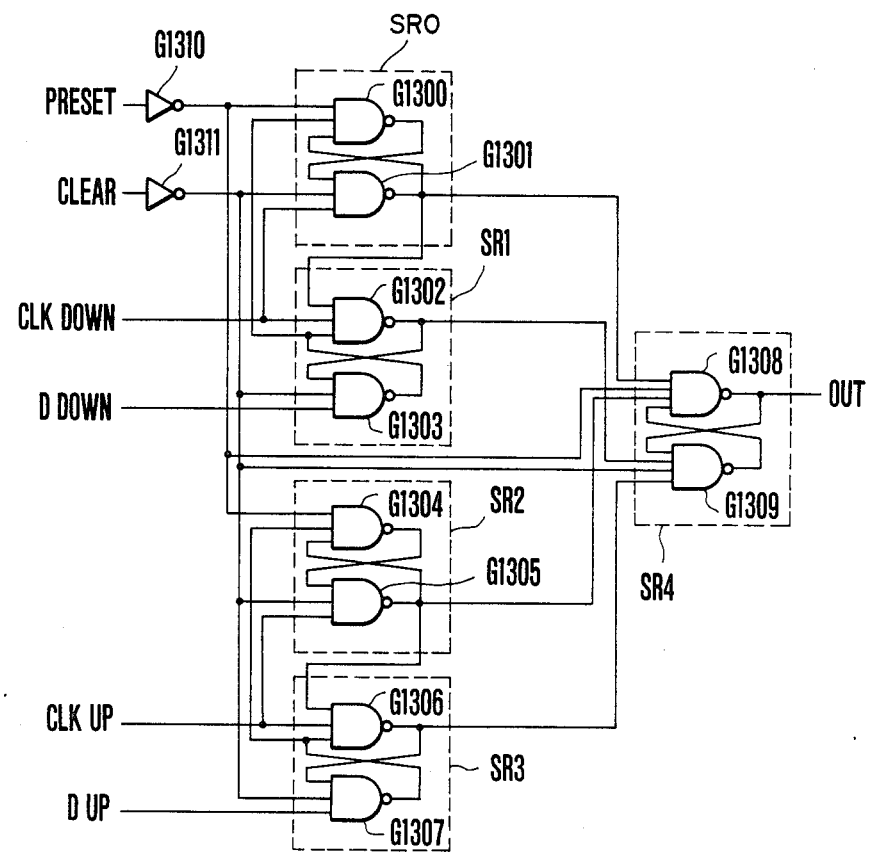
FIG. 13 shows the detail of the registers 1000, 1005 and 1012.

In FIG. 13, G1300 to G1309 are respectively a NAND gate, and G1300, G1302, G1304, G1306 and G1308 respectively pair with G1301, G1303, G1305, G1307 and G1309 to constitute S-R flip-flops (hereinafter called S-RFF) SR0 to 4. G1310 and G1311 are respectively an inverter.

In this embodiment, when the preset input is "1", namely in the preset condition, the preset input is inverted by the inverter G1310 to give "0" to G1300, G1304 and G1308, thereby SR0 and SR2 are reset independently of the states of CLK-up, CLK-down, D-up and D-down, and at the same time "0" is given to G1302 from G1301 to set SR1 and "0" is given to G1306 from G1305 to set SR3. Since at least three outputs of G1310, S-RFF SR0 (G1301), S-RFF SR2 (G1305) of all the outputs received as input by G1308 are "0", the output of G1308 is "1", and since the inputs of G1309, namely the outputs of SR1 (G1302), SR3 (G1306) and the output of the inverter G1311 which is an inverted signal of the CLEAR input (="0") are all "1", the output of G1309 is "0" so that SR4 gets into a set condition and the output is preset to "1".

Next, when the CLEAR input is "1", namely in the clear condition, the CLEAR input is inverted by the inverter G1311 and is given to G1301, G1303, G1305, G1307 and G1309, thereby SR0 and SR2 get into a set condition independently of the states of CLK-up, CLK-down, D-up and D-down, and SR1, AR3, and SR4 are thereby brought into a reset condition and the output is cleared to "0".

Next, when all of the preset CLEAR input, CLK-up input, CLK-down input are "0", SR0 and SR1 are brought into a set condition due to "0" of the CLK-down input, and SR2 and SR3 are brought into the set condition due to "0" of the CLK-up input, so that all the inputs except the signals given by G1308 and G1309 to each other become "1", thus maintaining the state set or reset in advance and the state as stored before is continuously output.

When the rising signal is given to CLK-down, supposing D-down is "1", the output of G1302 is "1", because SR1 is not in the set condition, and the output of G1311 which is the inverted signal of CLEAR (="0") is also "1", the output of G1303 whose inputs are all "1" is "0", G1302 which inputs the output "0" maintains its output at "1", G1300 outputs "1" and G1301 outputs "0" (SR0 being in the reset condition) to G1308 to bring SR4 into the set condition, because the output of the inverter G1311 which is an inverted signal of CLEAR and the CLK-down input are all "1".

Also supposing that D-down is "0", the output of G1303 is "1", and the output of G1301 and CLK-down are "1" due to the fact that SR0 has been previously in the set condition so that G1302 outputs "0" (SR1 being in the set condition) to G1309, thereby bringing SR4 into the reset condition. Regarding the input to G1301, CLK-down is "1", but the input of G1300, the output of G1310 which is an inverted signal of the preset condition, G1303 and G1301 are all "1", the output of G1300 is "0" and the output of G1301 remains as "1".

Even if D-down changes after the rising of CLK-down, S-RFF, in which either SR0 or SR1 gets into the reset condition by the rising signal of CLK-down will be again brought into the set condition, so that all of the inputs to the SR4 from SR0, SR1, SR2 and SR3 become again "1" and the state of SR4 does not change.

When the rising signal is given to CLK-up, the same operational functions are made as when the rising signal is given to CLK-down, where SR2 corresponds to SR0, SR3 to SR1, CLK-up to CLK-down, and D-up to D-down.

Figure 9A:
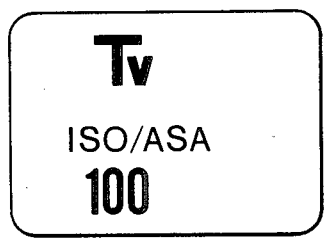

The embodiment of this invention which is arranged as described above operates as follows: Let us first assume that an open aperture light measurement type interchangeable lens is mounted on the camera with the aperture adjustment or setting ring of the lens set at its position "A" and the power supply of the camera is on with none of the operation buttons shown in FIG. 3 pushed. Under this condition, all the switches S1–S3 are off. Therefore, the AND gates G10–G20 produce the information coming from the registers 81, 82 and 83. Therefore, one of the liquid crystal cells 62–63 which are arranged to display the selected photographing mode, for example, as shown in FIG. 9(a), the liquid crystal cell 65 which displays "ISO/ASA" and one of the liquid crystal cells 66–68 which display film sensitivity values are driven. Further, since the battery check switch S3 is off, the battery check circuit 83 does not operate and accordingly, the liquid crystal cells 69, 70 and 71 which are arranged to display the result of battery check are not driven.

Figure 9B:
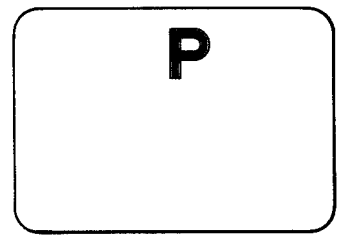
FIG. 9(b) shows a display pattern obtained when the camera becomes a shutter time priority AE photographing mode during a photographing operation mode selecting process.
Figure 9C:
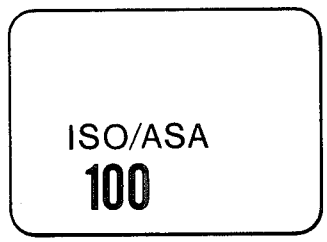
FIG. 9(c) shows a display pattern obtained when a film sensitivity value of 100 is obtained during a film sensitivity value selecting process.
Figure 9D:
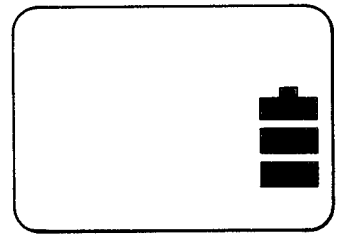
FIG. 9(d) shows a display pattern obtained when the voltage of power supply is high at the time of battery check.
Figure 9E:
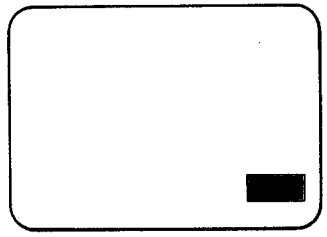

In checking for the voltage of the battery, the battery check button 55 is pushed. The switch S3 then turns on and a low (L) level signal is supplied to the gates G10–G17. Accordingly, the levels of the outputs of the gates G10–G17 become low. None of the liquid crystal cells 61–68 are driven while the battery check display liquid crystal cells 69–71 alone become drivable. With the switch S3 pushed and turning on, the battery check ciuruit 83 operates to have the level of the power supply or power source voltage displayed and lighted up in a bar graph state. FIG. 9(d) shows this display indicating a sufficiently high power source voltage. FIG. 9(e) shows the display indicating a power source voltage which is close to the inhibiting voltage and thus urging the photographer to replace the battery.

In setting a film sensitivity value, when the photographer pushes the button 54, the switch S1 turns on. The signal of the switch S1 is supplied to the gates G14–G20 to make thereby the levels of the outputs of these gates low. Therefore, the display liquid crystal cells 61–64 and 69–71 are extinguished while the film sensitivity display cells light up, for example, as shown in FIG. 9(c). In this instance, the liquid crystal cell 65 which displays "ISO/ASA" and one of the liquid ceystal cells 66, 67 and 68 which corresponds to the previously set film sensitivity value are driven. Under this condition, the setting value of the film sensitivity can be changed by pushing the shift button 56. With the film sensitivity having previously been set at 100 which is to be displayed by the liquid crystal cell 67, for example, the display is shifted to 400 which is displayed by the liquid crystal cell 68 when the up shifting button 56a is pushed and to 25 which is displayed by another cell 66 when the down shifting button 56b is pushed. The information on the newly set value of film sensitivity is then supplied to the exposure control circuit 84.

In changing the photographing mode, the camera according to this invention operates as follows: When the photographer pushes the button 53 of FIG. 3 for changing the mode, the switch S2 turns on. The outputs of the AND gates G10–G13, G18–G20 become "0". Therefore, the film sensitivity display liquid crystal cells 65–68 and the battery check display liquid crystal cells 69–71 are extinguished. Meanwhile, among the photographing mode display liquid crystal cells 61–64, a cell which corresponds to the selected photographing mode is alone driven to make a display.

Under this condition, when the photographer pushes one of the shift buttons 56, either the switch S10 or S11 turns on to supply a signal via the gate G3 or G4 to the register 82. In response to this signal, the register 82 shifts the photographing mode. For example, the mode can be shifted from the shutter priority AE photographing mode to the programed AE mode which is to be displayed as shown in FIG. 9(b). The information on the selected photographing mode is tramsmitted both to the liquid crystal display device 85 and to the exposure control circuit 84. The exposure control circuit 84 then performs exposure control according to the selected mode.

Under this condition, if the photographer moves the mark 212 of the aperture setting ring 208 from the index 206, that is, when the camera is set into the manual operation mode, the switch S4 turns on. Then, since the maximum aperture value of the open aperture light measurement type interchangeable lens is in most cases less than F 5.6, not all of the outputs 87a, 87b and 87c of the maximum aperture value signal generating circuit 87 become "1" as shown in FIG. 7. Therefore, the output of the AND gate G5 is at "0", that of the AND gate 105 at "0" and that of the AND gate 106 at "1". Then, the liquid crystal cell 61 is driven via the AND gate G14, the exclusive OR gate G25 and the driver G36. The cell 61 displays "M" to inform the photographer that the manual operation mode has been selected.

Further, in case that an open aperture light measurement type interchangeable lens having a maximum aperture value at F 5.6 is mounted on the camera with the mark 212 of the aperture setting ring 208 adjusted to the index 206, that is, when the aperture of the lens 202 is set under automatic control, the output of the AND gate G5 is at "1" and, since the switch S4 is off and the signal output of the switch S4 is also at "1", the output of the AND gate 105 also becomes "1".

Therefore, even in the case of an open aperture light measurement type interchangeable lens, if the maximum aperture value of the lens is F 5.6 and the camera is in the manual operation mode, it becomes possible that the stop down aperture priority mode might be selected when the shift button 56a or 56b is pushed while pushing the button 53 of FIG. 3 for changing the exposure control mode. However, even if the stop down aperture priority mode is thus selected, photographing still can be performed with the lens left at the maximum aperture, because the exposure control circuit 84 then operates in the maximum aperture priority AE mode irrespective of the aperture value set on the lens. Therefore, photographing can be satisfactorily carried out.

Figure 1:
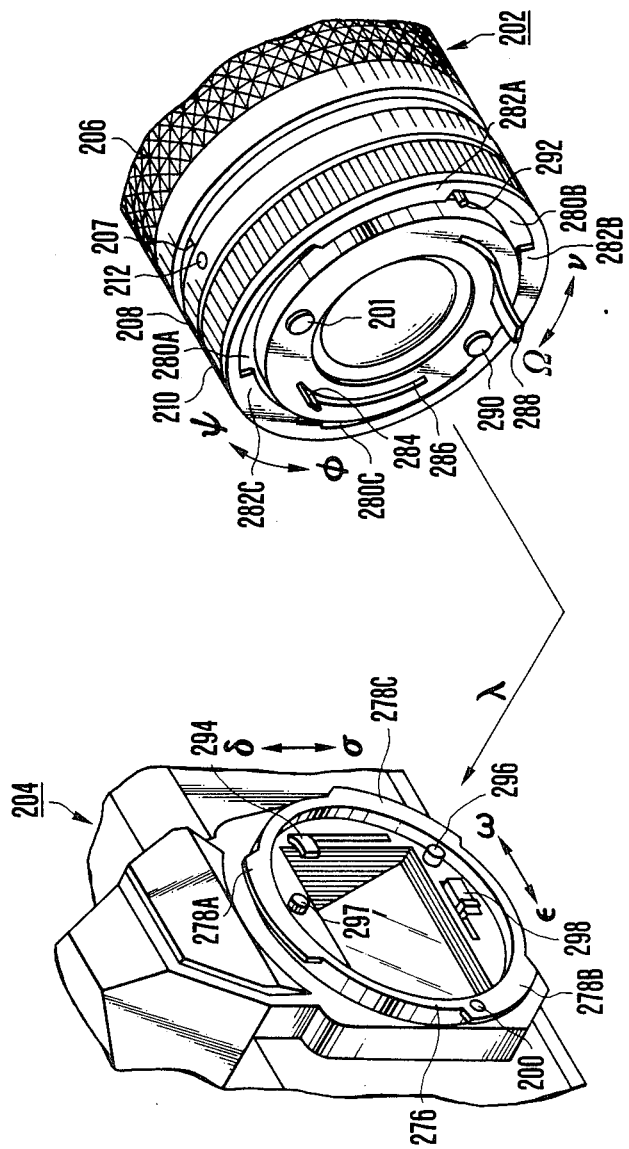
FIG. 1 is an oblique view showing arrangement for transmission of information between a camera body and a lens assembly.

While the operation of the camera with the open aperture light measurement type interchangeable lens mounted thereon is as described above, the camera operates as follows with a stop down aperture light measurement type interchangeable lens mounted thereon: Since there is no AE pin 292 with the stop down light measurement type interchangeable lens mounted on the camera body, the switch S4 of the AE detecting part 200 of FIG. 1 turns on. There is also no maximum aperture pin 290. Since the height of the position of the maximum aperture pin 290 is equal to the height of the open aperture light measurement type interchangeable lens in its position of F 5.6, all the terminals 87a, 87b and 87c of the maximum aperture value signal generating circuit 87 produce signals of "1" as shown in FIG. 7.

Therefore, the output of the AND gate G5 becomes "1" and, among the outputs of the photographing mode storage register 82, the output signal 82d becomes selectable. The liquid crystal cell to be driven in this instance is thus shiftable in the sequence of cells 62, 63 and 64. Then, the photographing mode is selected with the shift button 56 pushed in such a way as to have the liquid crystal cell 64 driven. In case that the stop down aperture priority AE mode is selected, the output of the register 103 becomes "1". This causes one of the inputs of the AND gate 106 to become "0" via the inverter 107. The liquid crystal cell 61 which is arranged to display "M" is therefore not driven. When the output 103a of the register 103 becomes "1", the output 82d of the photographing mode storege register 82 becomes "1" to drive the liquid crystal cell 64 via the gates G17 and G28 and the driver G39. The cell 64 then displays " ◯ " to inform the photographer of the selection of the stop down aperture priority mode. Therefore, when the camera according to this invention has a stop down aperture light measurement type interchangeable lens mounted thereon, the photographer can take a picture with an apposite exposure by selecting the stop down aperture priority AE mode.

In accordance with this invention, as described in the foregoing, in a camera of the kind capable of selecting either a mode in which the aperture of the lens is automatically controllable from the camera body or a mode in which the aperture is to be manually set and permitting use of either an open aperture light measurement type interchangeable lens having the AE pin which protrudes according to the mode selected or a stop down aperture light measurement type interchangeable lens, there is provided switch means which cooperates with the AE pin; and a stop down aperture priority mode is selectable according to information from the maximum aperture signal pin of the interchangeable lens and information from the switch means which cooperates with the AE pin. Such being the arrangement of the invention, when an open aperture light measurement tupe interchangeable lens is mounted on the camera, the camera generally inhibits (with the exception of some special case) selection of the stop down aperture priority AE mode and permits the stop down aperture priority AE mode only when a stop down aperture light measurement type interchangeable lens is mounted on the camera. This is an advantage of the invention.

What is claimed is:

1. A camera system comprising:
   (a) a camera capable of discriminating the type of a lens mounted thereon, said camera comprising:
      (1) first discriminating means for detecting whether the lens mounted on the camera is in an automatic mode in which the aperture value of the lens is controllable from the side of the camera or in a manual mode in which the aperture value is preset on the side of the lens, said first discriminating means being arranged to make discrimination by engaging an AE pin disposed on the side of the lens;
      (2) second discriminating means arranged to detect the height of the mount of the lens in a position corresponding to a maximum aperture value signal pin provided on the lens and to produce a first signal when the detected height is not less than a predetermined value and a second signal when the detected height is less than the predetermined value; and
      (3) means for permitting selection of a stop down aperture priority mode when said first discriminating means detects that the lens is in tne manual mode and the second discriminating means produces said second signal;
   (b) a first type lens mountable on the camera, said first type lens comprising:
      (1) selecting means for effecting switch-over between said automatic mode and said manual mode, said selecting means being arranged to change the state of an AE pin according to the mode selected thereby; and
      (2) a pin having a height corresponding to the maximum aperture value of the lens; and
   (c) a second type lens to be mounted on said camera, said lens being, arranged such:
      (1) that the position of the lens corresponding to said AE pin of said first type lens represents the manual mode; and
      (2) that the position of the lens corresponding to said pin of the height corresponding to said maximum aperture value is at a height which corresponds to said predetermined value.

2. A camera system comprising:
   (a) a camera capable of discriminating the type of a lens mounted thereon, said camera including:
      (1) discriminating means for detecting whether said lens mounted on the camera is in an automatic mode in which the aperture value of the lens is controllable from the side of the camera or in a manual mode in which the aperture value is preset on the side of the lens;
      (2) means for producing a first signal when the height of a pin representing the maximum aperture value of the lens mounted on the camera is not less than a predetermined value and for producing a second signal when said height is less than said predetermined value; and
      (3) means for permitting selection of a stop down aperture priority mode when the second signal is produced with the lens in the manual mode; and
   (b) a first type lens mountable on the camera, said lens including:
      (1) selecting means for effecting switch-over between said automatic mode and said manual mode; and
      (2) a pin having a height corresponding to the maximum aperture value of the lens; and
   (c) a second type lens which is mountable on the camera and is operatable only in the manual mode, said second lens being characterized in that:
   the position of the lens corresponding to said pin having the height corresponding to the maximum aperture value is at a height which corresponds to said predetermined value.

3. A camera having the number of selectable automatic exposure control modes variable according to the type of a photo-taking lens mounted thereon, comprising:
   (a) first means for producing a first signal by detecting that the height of the position of said photo-taking lens corresponding to a pin representing the maximum aperture value of the lens is at a predetermined value;
   (b) second means for producing a second signal by detecting that said photo-taking lens mounted on the camera is in a manual mode;
   (c) third means for producing a third signal when both the first and second signals are produced; and
   (d) means for permitting selection of a stop down aperture priority photographing mode in response to said third signal.

4. A camera according to claim 3, wherein said first means includes:
   (a) detecting means for detecting a height of a position of said photo-taking lens mounted on the camera corresponding to a pin representing the maximum aperture value of said lens; and
   (b) means which compares the height detected by said detecting means with a predetermined value and produces said first signal when said height is not less than a predetermined value.

5. A camera of the kind arranged to display a selectable photographing mode according to a photo-taking lens mounted thereon, comprising:
 (a) detecting means for detecting the type of said photo-taking lens mounted on the camera;
 (b) display means for displaying photographing modes; and
 (c) inhibiting means for inhibiting said display means from inhibiting a specific one of said photographing modes according to the type of the photo-taking lens detected by said detecting means.

6. A camera according to claim 6, wherein said detecting means includes discriminating means for detecting whether the phototaking lens mounted on the camera is an open aperture light measurement type lens or a stop down aperture light measurement type; and
 wherein said inhibiting means inhibits the display of a stop down aperture priority mode among the photographing modes when the photo-taking lens mounted is of the open aperture light measurement type.

7. A camera displaying a photographing mode, comprising:
 (a) detecting means for detecting the type of an adaptor mounted;
 (b) display means for displaying photographing modes; and
 (c) inhibiting means for inhibiting said display means from displaying a specific one of said photographing modes according to the type of said adaptor detected by said detecting means.

8. A camera according to claim 7, wherein said adaptor is a photo-taking lens.

9. A camera according to claim 8, wherein said photographing modes are automatic exposure control modes.

10. A camera of the kind changing the kind of selectable automatic exposure control modes according to the type of photo-taking lens mounted thereon, comprising:
 (a) detecting means for detecting the type of the photo-taking lens mounted on the camera; and
 (b) means for varying the kind of selectable automatic exposure control modes according to the type of the photo-taking lens detected by said detecting means.

* * * * *

Notice of Adverse Decision in Interference

In Interference No. 102,145, involving Patent No. 4,623,234, M. Shimizu, S. Matsuyama, CAMERA, final judgment adverse to the patentees was rendered Apr. 4, 1990, as to claims 5-10.

(*Official Gazette May 8, 1990*)